United States Patent [19]

Wulleman

[11] 3,932,705
[45] Jan. 13, 1976

[54] PSK TELEMETERING SYNCHRONIZATION AND DEMODULATION APPARATUS INCLUDING AN AMBIGUITY ELIMINATING DEVICE

[75] Inventor: Vianney Jean-Marie Corneille Wulleman, Soisy-sur-Seine, France

[73] Assignee: Centre National d'Etudes Spatiales, Paris, France

[22] Filed: May 9, 1973

[21] Appl. No.: 358,499

[30] Foreign Application Priority Data
May 10, 1972  France .............................. 72.16867

[52] U.S. Cl. ................ 178/68; 178/69.5 R; 178/88; 179/15 BS; 325/322; 328/14
[51] Int. Cl.² .......................................... H04L 7/06
[58] Field of Search .......... 178/67, 68, 69, 5 R, 88; 179/15 BS; 325/320, 321, 344, 346, 419, 420, 423, 435, 322; 329/122, 123; 328/14, 159, 160

[56]  References Cited
UNITED STATES PATENTS
3,646,451   2/1972   Shoap .......................... 178/69.5 R
3,742,139   6/1973   Boehly .......................... 178/69.5 R Primary Examiner—Benedict V. Safourek
Assistant Examiner—Marc E. Bookbinder
Attorney, Agent, or Firm—Wigman & Cohen

[57]  ABSTRACT

A PSK synchronizer and demodulator with message coded in biphase, modulated in phase by a subcarrier, having three chains I, II, III of identical general structure, the first operating on twice the frequency $f_o$ of the subcarrier, the second on twice the clock frequency F of the bits, and the third on the clock frequency itself, forming an ambiguity eliminating device which enables the demodulated message to be restored in NRZ-C. Each of the chains includes a spectral line generator and a phase locked loop.

9 Claims, 6 Drawing Figures

FIG. 1

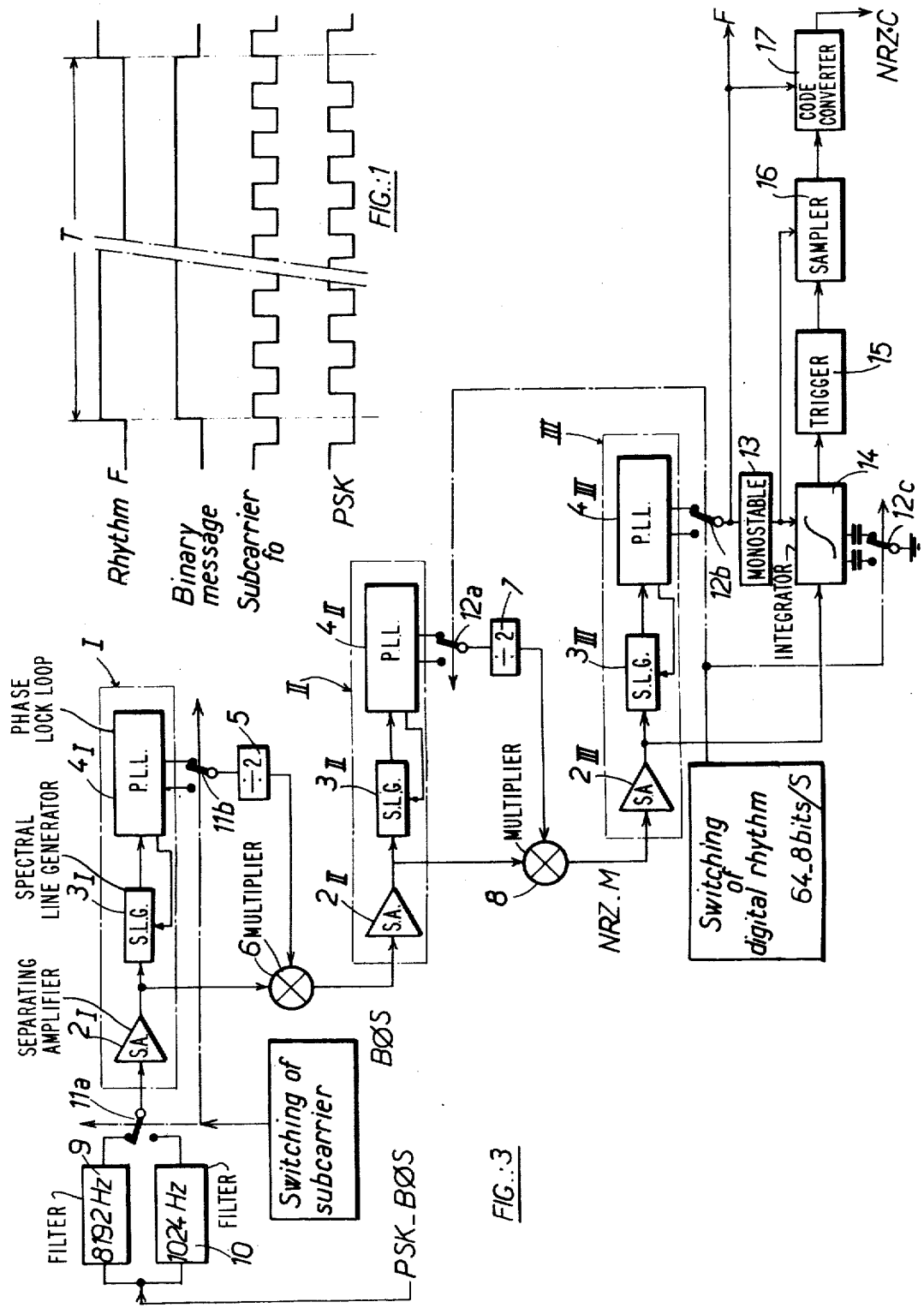

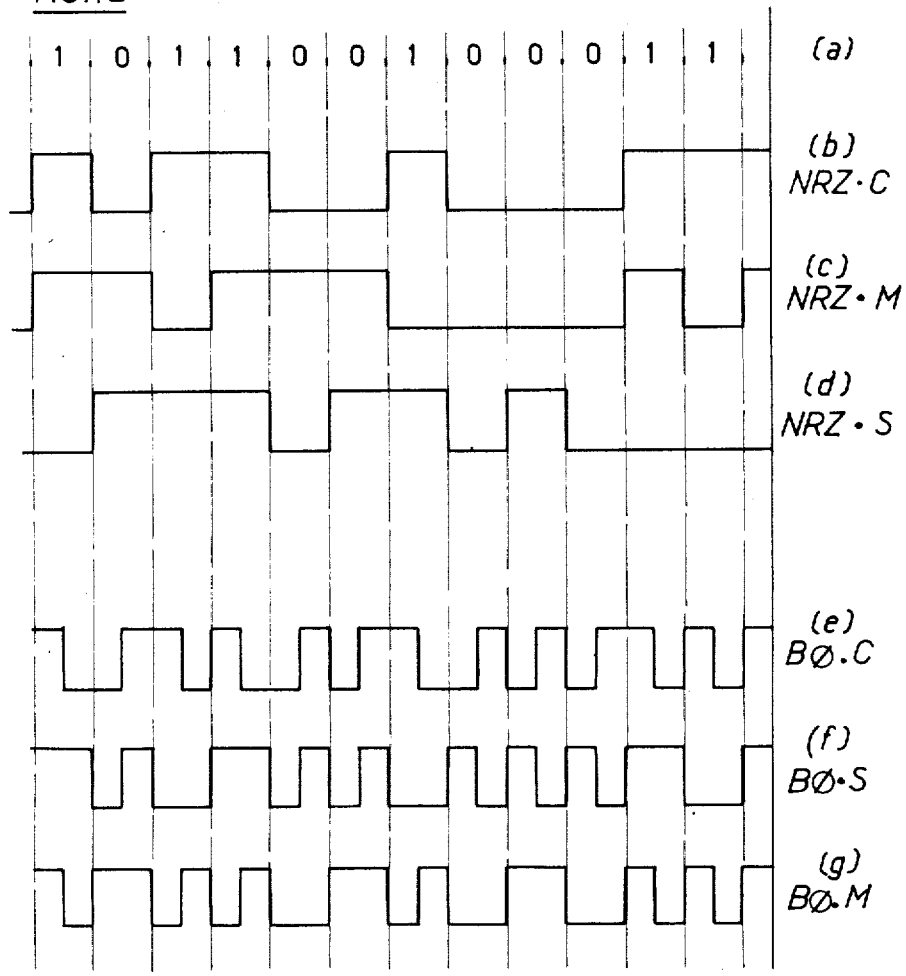
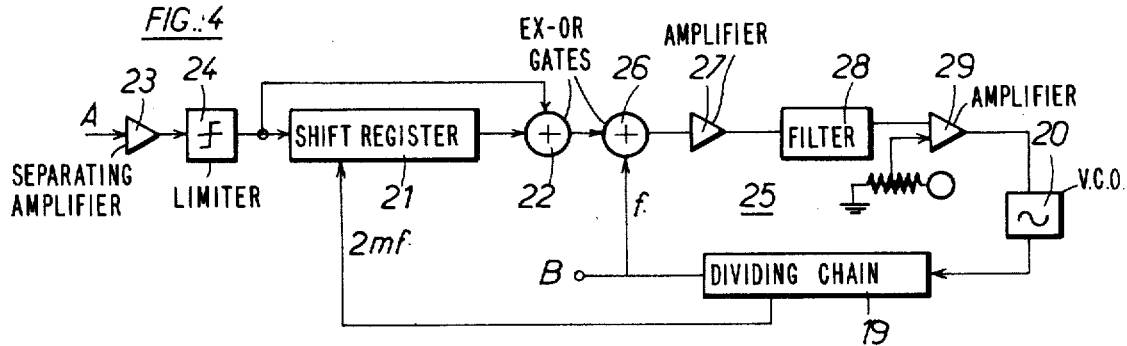

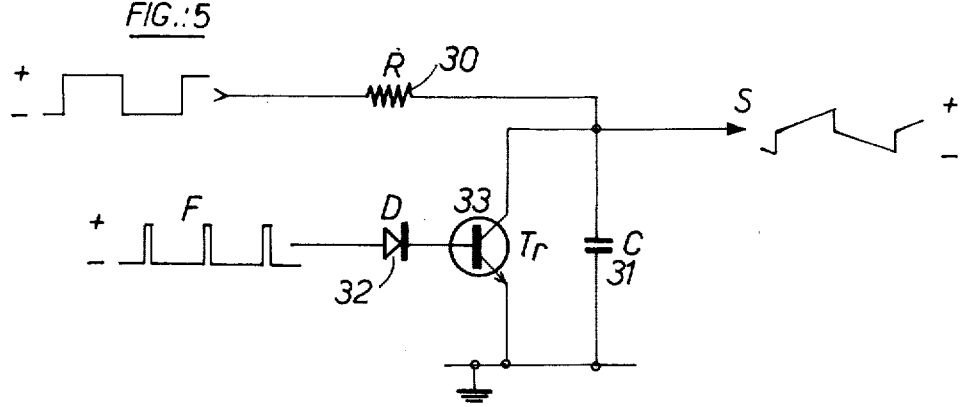
FIG.:5
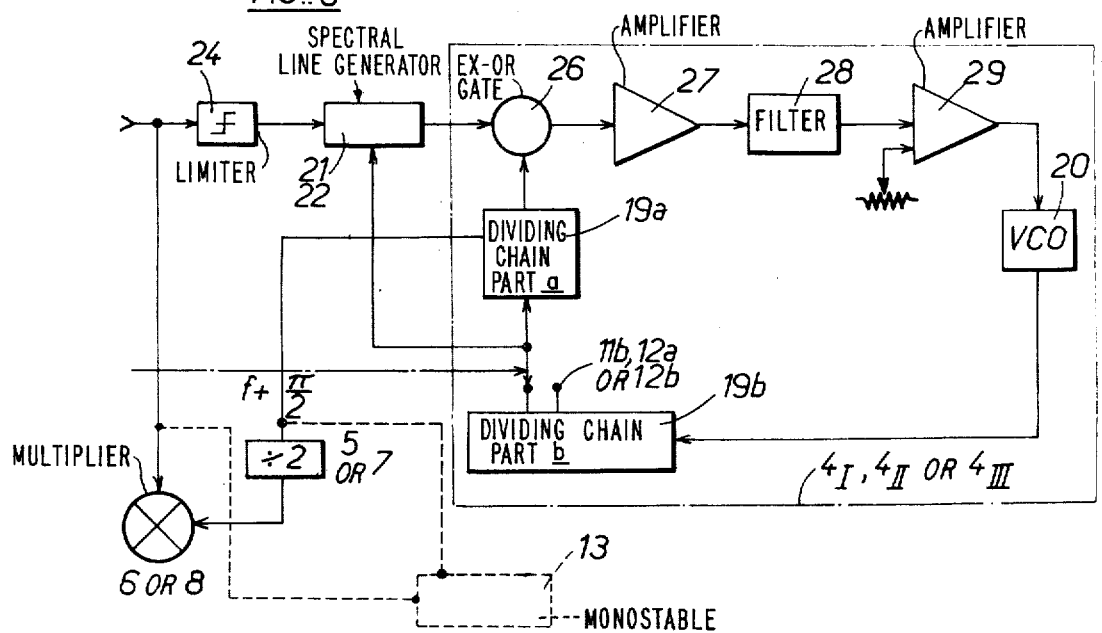
FIG.:6

PSK TELEMETERING SYNCHRONIZATION AND DEMODULATION APPARATUS INCLUDING AN AMBIGUITY ELIMINATING DEVICE

BACKGROUND OF THE INVENTION

The present invention is concerned with radioelectric techniques and more particularly with links with satellites or other ballistic devices. The invention relates more specifically, on the one hand, to a synchronizer and demodulator for a message coded in biphase (and even B $\phi$ S), which modulates a subcarrier in phase, or, in other words, a PSK synchronizer and demodulator, and, on the other hand, to a device for eliminating ambiguity from a binary coded message, in the present case in N R Z, which is included in a synchronizer and demodulator of this kind.

So as not to leave room for any uncertainty as to the meaning of the conventional terms used above, as well as that of others which will appear in the course of this specification, ideas and definitions relating to these terms will be recited hereunder.

First of all, it is known that PSK (phase shift keying) telemetering is a method of modulating the phase of a subcarrier by a PCM signal, there being understood by subcarrier a wave carrying the message, this "subcarrier" modulating a "carrier" or not. Here the modulation considered is that imposed by a contingent message with two possible levels (+1 and −1), which is coded by a PCM, NRZ or biphase (B $\phi$) signal (see FIG. 1). Consequently, PSK telemetering is characterised by the ratio $n = f_0/F$, $f_o$ being the subcarrier frequency and F the bit rate or rhythm.

PCM (Pulse Code Modulation) is a system multiplexed in time which is generally used when a large number of items of information must be transmitted in the form of successive pulses. Each pulse capable of assuming one of the two possible levels "0" and "1" is called a bit.

Each telemetering channel to be transmitted is binary coded to form one or more words. A group of a certain number of words constitutes a sequence or cycle and a group of several cycles constitutes a sub-cycle.

The PCM message transmitted is constituted by a group of words, cycles and sub-cycles which can be marked within the message by certain well-defined binary configurations.

Thus, the PCM message will appear as a sequence of 0's and 1's of a contingent nature transmitted in accordance with a code to be chosen, usually from among those given hereunder. (The duration of a period of the code will be called T; the digital rate or rhythm is F = 1/T).

1 — NRZ (no-return-to-zero) Codes The entire period constitutes the support for the information.
  a. NRZ-L (Level) or NRZ-C (Change) Code A 1 or a 0 is represented by a high level or by a low level (according to the convention adopted). There is therefore a transition every time the bit changes state (from 0 to 1 or from 1 to 0).
  b. NRZ-M (Mark) Code The appearance of a 1 is marked by a transition of level, positive or negative according to whether the preceding level was low or high; the 0's have no effect.
  c. NRZ-S (Space) Code The appearance of a 0 is marked by a transition of the level, positive or negative according to the preceding level; the 1's have no effect.

2 — Biphase Codes Biphase codes are the result of the multiplication of the NRZ codes by the digital rate F in phase with the signal.
  a. Biphase L or C (B $\phi$-L or B $\phi$-C) Code The information is represented by a transition in the middle of the period: negative transition for a 1, positive transition for a 0, for example.
  b. Biphase S (B $\phi$-S) Code This is elaborated from the NRZ-M code; the appearance of a 1 is manifested by an inversion in the direction of the transition delayed by a half-period.
  c. Biphase M (B $\phi$-M) Code This is elaborated from the NRZ-S code; the appearance of a O is manifested by an inversion in the direction of the transition delayed by a half-period. The B $\phi$-S code is elaborated from the NRZ-M code.

The above-defined codes are illustrated in FIG. 2 of the accompanying drawings.

These definitions having been given, it is furthermore appropriate to state precisely that the invention relates to a PSK synchronizer and demodulator designed to receive a PSK transmission constituted by a subcarrier modulated in Biphase S and serving to produce a coherent demodulation of the message and to extract therefrom a local clock signal and a message in NRZ code (and even NRZ-C), it being possible for the last-mentioned message to be decoded by using the local clock signal created in this way, the whole in the presence of noise.

After extraction of the message and its demodulation, a PSK synchronizing and demodulating apparatus generally supplies information still having a certain ambiguity, that is to say it is not certain whether the l's are not in place of the 0's and vice versa, this being due to a similar uncertainty concerning the restoration of the locally recreated clock rhythm F, and after division by 2 or a power of 2. Consequently, a synchronizing and demodulating apparatus of this kind generally comprises a device intervening at the end of the demodulation operation and eliminating the ambiguity in question.

One of the methods which is used most to this end consists in detecting the biphase signal and in carrying out, from this signal, a statistical count of these transitions at mid-bit and at the beginning of a bit. According to the resulting value of the calculating counter (maximum or zero value), it is decided either to retain or to invert the clock signal F.

Another method consists in filtering the NRZ signal and, starting from this signal and the assumed transitions, in triggering a monostable which will put the divider or the dividing chain back into phase.

These methods are based on the detection of the transitions of the message drowned in the noise and they present the disadvantage of having a considerable threshold, beyond which recognition of the transitions of the message cannot be effected correctly, these transitions being merged in the noise.

Orders for putting the signal having the clock rhythm F back into phase therefore appear at the wrong time and thereby render the information detected unexploitable.

SUMMARY OF THE INVENTION

Consequently, the invention also relates to an ambiguity eliminating device capable of being incorporated in a PSK synchronizer and demodulator and which frees itself from the limitation of the working threshold and comprises, to this end, means deffering from those previously known.

These means, as will be seen, essentially comprise a phase loop which locks on to the transitions of the message coded in NRZ-M produced in the PSK synchronizer and demodulator, without affecting the efficiency and in the presence of noise.

The object of the invention is to provide a synchronizer and demodulator for a message coded in biphase S, modulated in phase by a subcarrier, comprising extraction means for extracting the message coded in NRZ-M from the modulated signals; a spectral line generator of the type comprising multiplication means for multiplying the signal by the same signal delayed, for regenerating the spectral line of the rhythm F of the message (although in the spectrum no power is carried on this same rhythm F), connection means for applying to said generator the message coded in NRZ-M provided by the extraction means, and a phase loop adapted to operate on the rhythm F and incorporating connecting means for receiving the signals at the frequency F supplied by the said spectral line generator.

The principal advantage of this solution is that the threshold of the loop is much lower than the threshold of a system based on the detection of the transitions of a message accompanied by noise and there will consequently be no limit due to the noise, except for the limit of the threshold of the loop, which will be relatively low.

It is known, in fact, that in a well-designed synchronization and detection apparatus the information detected becomes unexploitable well before the acquisition of the rhythm is lost.

The invention also provides a PSK synchronizer and demodulator provided with an ambiguity eliminating device of this kind.

From another angle, it can therefore be said that the invention also provides a PSK synchronizer and demodulator the efficiency of which approaches optimum efficiency as closely as possible, which is endowed with a wide range of working frequencies greater than that of the known PSK synchronizers and demodulators, and using conventional phase loops equipped with a voltage controlled oscillator.

BRIEF DESCRIPTION OF THE DRAWINGS.

The invention will now be further described, by way of non-limitative example, with reference to the accompanying drawings, apart from FIGS. 1 and 2 already mentioned, in which:

FIG. 3 is a general diagram of a PSK synchronizer and demodulator, including an ambiguity eliminating device, according to the invention;

FIG. 4 shows a spectral line generator and associated phase-locked loop structure preferably employed in the present invention;

FIG. 5 is a diagram of an integrator with resetting to zero included in detection apparatus according to the invention; and FIG. 6 shows, inter alia, the structure of the phase locked loops included in a synchronizer and demodulator according to the invention.

DESCRIPTION OF PREFERRED EMBODIMENT

In the assembly of the circuits of the synchronizer and demodulator shown in FIG. 3, there can be distinguished three stages I, II, III defined in chain-dotted lines, which form the basis of the apparatus and the general structure of which is identical.

In each of these stages there are, included:
- a separating amplifier $2_I$, $2_{II}$, $2_{III}$; - a spectral line generator $3_I$, $3_{II}$, $3_{III}$, and their associated respective phase-locked loops $4_I$, $4_{II}$, $4_{III}$.

The "spectral line generator" is a device for regenerating the spectral line of the rhythm of a message having random binary signals deprived on the same rhythm of any power carried thereon; to this end this generator effects the multiplication, in a multiplying element, of the signal by the signal itself but delayed by a delay time smaller than the clock period of the said rhythm.

Spectral line generators or generators supplying a more or less equivalent result are known elements. Reference is made, for example, to the article by William C. Lindsey and Marvin Kenneth Simon in "Proceedings of the IEEE", vol. 58, No. 9, Sept. 1970, pages 1315–1321, which sets forth the methods employed for restoring the rate of a signal and including such generators, namely the loop using a device for raising to the square the input signal, and the Costas loop.

However, for reasons of efficiency, a special generator is preferably employed which is described below.

The principle of the operation of multiplication will first be mentioned, which consists in delaying the binary signals by a quantity $\Delta$, with $0>F>T$, T being the period of the bit rate or rhythm, and in multiplying this signal by the same signal, undelayed.

The signal $S(t)$ is to be applied to a delay device having the delay value $\Delta$, and this provides the signal $S(t-\Delta)$ which is applied to one input of a multiplier, the other input of which receives the signal $S(t)$ directly through a branch channel.

One can assume, for example, that the signal $S(t)$ has the form of contingent rectangular waves of period T (probability of transition $= p$ with $0 \leq p \leq 1$) and that $\Delta = T/2$.

It is found that, graphically, the signal $S(t) \times S(t-\Delta)$ can be broken down into two signals:

$$S(t) \times S(t-\Delta) = X(t) + Y(t)$$

This breaking-down reveals, on the one hand, a signal $X(t)$ which is periodic and presents the bit rhythm F, which is the one wanted, and, on the other hand, a contingent signal $Y(t)$. The power available on the spectral line is a function of the delay $\Delta$, with a maximum for $\Delta = T/2$, and also of the density of transition $p$ of the signal $S(t)$, the said power being proportional to $p^2$.

The delay $\Delta$ could be obtained with the aid of a delay line or a filter. One of the merits of the invention consists in carrying out this operation by taking advantage of the digital aspect of the message (reinforced if necessary by elements treating the signals to give them the appropriate form) and by using a controlled shift register as an element for producing the delay. This shift register comprises, as known per se, N flip-flops and the signal output from the register is delayed, after passing through the register, by a time $\Delta = NT$, if the register is controlled by the rhythm F.

Now, a delay less than T, or in particular T/2, is needed. It is therefore expedient for the control rhythm of the register to be at least 2F or, conveniently F multiplied by a certain power of two.

It may be assumed, by way of example, that use is made of a shift register with four flip-flops, of known type, fed by the signal $S(t)$.

If rhythms which are multiples of F by powers of 2 (2F, 4F, 8F, etc.) are available, it will be appropriate to constitute the register by a suitable number of flip-flops, which is a function of the control rhythm, to obtain the desired delay; that is to say, if the register comprises $m$ flip-flops, a driving frequency equal to 2mF, with m = $2^a$, will have to be available, or again that the dividing chain which is to supply this frequency, as will be seen hereinafter, should itself comprise at least n flip-flops, with $n = a + 1$.

The number of flip-flops in the shift register will be a function of the noise band at the input of the apparatus. The more flip-flops the register comprises (the sampling rhythm increasing in the same proportion), the more considerable will be the power restored on the spectral line, in the presence of noise.

It is appropriate to state clearly here that for the realization of the spectral line generator the multiplier must be a simultaneous-multiplication operator (preferably without inherent delay) having two inputs and one output. This may be an analogue multiplier, but it is also possible to take advantage of the digital aspect of the processing to construct the multiplier simply and draw an additional advantage therefrom. In fact, in binary operation, it is found that an exclusive-OR logic circuit (which performs the function A + B = modulo 2 sum) is equivalent in this case to a multiplier.

Thus, in the invention, a controlled shift register and an exclusive-OR cell will be associated.

However, it remains to introduce to this association means for producing the frequency 2mF adapted to drive the shift register. This means, in the form of a phase-locked loop, is what is shown in combination with the spectral line generator in FIG. 4.

The arrangement of FIG. 4 comprises a shift register 21 functioning as a controlled delay element and a miltiplier or exclusive-OR circuit 22, these two elements producing the multiplication of the signal by itself, suitably delayed. They are fed at A through the medium of a separating amplifier 23 and a limiter 24 having two limitation levels, a high and a low level, so that truly rectangular signals are obtained at the input of the register 21. At the output of the multiplier 22 there is connected a phase locked loop 25, which locks on to the frequency $f$ of the arrangement. This phase locked loop has a structure which is conventional as a whole in the sense that it comprises, in a loop and in order, an exclusive-OR circuit or gate 26, a translating amplifier 27 supplying a signal symmetrical with respect to zero, a loop filter 28 of passive analogue type, a differential operational amplifier 29 receiving a reference voltage at its second input, and a voltage controlled oscillator (VCO) 20. Normally, a loop of this kind locks on if a message containing a spectral line endowed with power is supplied to it. For this, the register 21 must be suitably driven and, to this end, the loop includes a dividing chain 19 for supplying register 21 with the driving frequency 2mf. The clock signals recreated locally, at the frequency $f$, can be picked up, for example, at B, at the output of the dividing chain, at the place where they feed the second input of the exclusive-OR circuit 26.

It can be seen that the various elements of the phase locked loop 25 of this system are indissociable for the generation of the desired spectral line.

This generator offers many advantages, because it is robust since it is constructed with a majority of integrated circuits, including the register 21; it does not entail any adjustment and can function at any frequency whatsoever without readjustment (within the very wide limits imposed by the inertia of the flip-flops), which the other known arrangements do not permit; it does not need an input filter to restore a spectral line.

It is clear that if the frequency varies, the driving of the register 21, deriving from the modification of the frequency of the VCO 20, automatically follows the variation in the frequency and instantaneously adopts the value of the delay of the register, retaining a fixed relation with the frequency of the loop. Moreover, if the working frequency is changed considerably, it is also possible to change the tap in the dividing chain 19.

Returning now to FIG. 3, the third element of each stage is illustrated as a phase-locked loop $4_I$, $4_{II}$, $4_{III}$, shown separated from the corresponding spectral line generators $3_I$, $3_{II}$, $3_{III}$, but in reality operated in conjunction therewith as aforedescribed and evidenced by FIGS. 4 and 6 of the drawings.

It is already apparent from the foregoing that, since the three stages I, II, III have a similar structure, the construction of the PSK synchronizer and demodulator is greatly facilitated, in spite of the fact that the working frequencies of each stage is not the same.

In fact, in the stage I, the generator $3_I$ has the function of producing a frequency ($2 f_o$) in relation with the frequency $f_o$ of the subcarrier; in the stage II, the generator $3_{II}$ supplies the frequency 2F, which is twice the clock rhythm. In the stage III, the generator $3_{III}$ supplies the frequency F of the clock rhythm and the reason for this arrangement will be shown.

It should be noted that these three stages and the three corresponding phase locked loops are of substantially identical make-up (see FIG. 6). Only the gain of these loops is modified in accordance with their working frequency, but the value of the capacitor of the loop filter may be the same for the three loops and, in the event of it being the same, enables action to be taken so that the band widths of the loops at 2F and F (in percentage of the frequency of the loop) are wider than on $2 f_o$. Instead of being divided by $n$, the loop band is divided only by $\sqrt{n}$ ($n$ being the ratio $f_o/F$).

This arrangement permits a relatively small acquisition time. It is known, in fact, that the greater the band width of the loop, the smaller is the acquisition time.

The subcarrier wave (or carrier) at frequency $f_o$, modulated by the B $\phi$S code, arrives at the amplifier $2_I$. As there are two transitions per period, the line generator $3_I$ and the phase locked loop $4_I$ operate on the frequency $2 f_o$. This is the reason why there is arranged at the output of the phase locked loop $4_I$ a scale-of-two divider 5 which feeds one input of a multiplier 6, for example of analogue type.

To extract the binary message, the modulated wave is applied to the second input of the multiplier 6 at the same time as it is applied to the generator $3_I$. This multiplier therefore supplies the message at its output.

It is recalled that this message is coded in biphase S. The signals which are transmitted by the separating amplifier $2_{II}$ to the spectral line generator $3_{II}$ are therefore signals in biphase S. It is known that the biphase message is constituted by level stretches with a duration of 1 bit and corresponding to the transitions from 0 to 1 or 1 to 0 of the NRZ message, and level stretches with a duration of ½ bit which are created by the transitions in the middle of the bit to mark its presence. This is why the elements $3_{II}$ and $4_{II}$ work, not on the frequency F, but on the frequency 2F, and it is necessary furthermore to provide a scale-of-two divider 7 at the output of the loop $4_{II}$ so as to apply signals adapted to effect the demodulation of the message to an input of the multiplier 8. The message in biphase S taken off at the output of the separating amplifier $2_{II}$ is applied to the other input of the multiplier 8. The signal obtained at the output of the multiplier 8 is in NRZ-M (with noise).

In fact, the B $\phi$-S signal having been elaborated, on its emission, from the NRZ-M message, it is obvious that the multiplication of the B $\phi$-S signal by the digital rate F in phase with this signal will restore the NRZ-M message at the output of the multiplier.

Now, the frequency 2F obtained from the second stage II, after division by 2, presents an ambiguity of phase (this is F or $\overline{F}$) and the detection of the NRZ-M signal makes it necessary to have the rhythm F without any ambiguity of phase.

This is why in this invention it is proposed to use an ambiguity eliminating device; in comparison with the conventional ambiguity eliminating devices (already mentioned hereinbefore) which have a limit working threshold, this device is particularly interesting for producing a synchronizer and demodulator with good efficiency and with a reduced detection or attainment time in relation to those in existence.

To this end, the elimination of ambiguity is ensured by a third stage with a structure similar to the preceding structures, but which locks on to the NRZ-M signal.

It may be observed that this time there is no longer any question of effecting a division of frequency by 2 at the output of the loop $4_{III}$, since the rhythm F has been obtained.

When there is no pulse signal at the input of the synchronizer and demodulator, the frequencies of the stages II and III, namely 2F and F, are very close to the expected frequency. Moreover, these stages have a band width distinctly larger than that of the stage I. On this account, when the signal is applied at the input of the synchronizer and demodulator, the stage I locks by means of its phase locked loop $4_I$ and at the same time the loops $4_{II}$ and $4_{III}$ of the stages II and III lock instantaneously. Moreover, the falling out of phase of the subcarrier loop $4_I$ by a few cycles does not cause the other loops to fall out of phase.

The performances, as regards the probability of errors, obtained with a synchronizer and demodulator according to the invention are similar to those of a so-called "optimum" synchronizer and demodulator; the acquisition time is extremely limited and remains constant whatever the subcarrier frequency or the frequency of the digital rhythm, it is from 4 to 10 times smaller than that of a so-called optimum synchronizer and modulator, while its working threshold is improved by 2 to 3 dB, which is advantageous in the presence of noise.

These characteristics are obviously valuable for a link with a ballistic device, in which any improvement in the efficiency and the reliability of the transmission has a big importance.

In practice, moreover, the synchronizer and demodulator is designed to operate with a PSK (B $\phi$S) message for subcarriers of either 8192 Hz or 1024 Hz and with rates of 64 or 8 bits/sec.

So as to reduce the noise band at the input, a bandpass filter 9, 10 is provided for each subcarrier. A switch 11a, 11b ensures the change-over of the circuits corresponding to each subcarrier and another switch 12a, 12b, 12c that of the circuits in accordance with the bit rhythm, on the stage I and on the stages II and III, respectively, as shown in FIG. 3.

The clock rhythm F in phase with the signal is taken off at the output of the switch element 12c, after the stage III. As regards the bit detection, this is carried out in a manner known per se with the aid of an integrator 14 with resetting to zero by the pulses at the clock rhythm delivered by a monostable 13, which integrator is followed by a decision circuit 15 constituted by a trigger and followed by a sampler 16 constituted by a flip-flop likewise actuated by the pulses delivered by the monostable 13 and by a code converter 17 effecting conversion into NRZ-C, which is the usual form of use of the message.

The integrator 14 with resetting to zero has, for example, the construction shown in FIG. 5. It comprises the series combination of a resistor 30 and a capacitor 31, at the input of which the signals to be integrated are applied. The zeroizing signals, at clock frequency F, are applied through the medium of a diode 32 connected in series to the base of a transistor 33 the emitter-collector path of which shunts the capacitor 31. The output signals have the form shown at S. It is expedient to pass them through the decision circuit 15 which may take the form of a limiter or trigger before acting on the sampling element 16.

It will be noted that, so far, according to the diagram of FIG. 3, it has been laid down for each of the stages I, II, III that each stage is constituted by the association in series of a spectral line generator $3_I$, $3_{II}$, $3_{III}$ and a phase locked loop $4_I$, $4_{II}$, $4_{III}$, which both operate on the same frequency f, this frequency being respectively equal to $2 f_o$, 2F and F for these three stages. In the circuit of FIG. 6 operating on the frequency f there are again found the elements of FIG. 4, which have been given the same reference numerals. Only the differences with respect to this latter Figure will therefore be noted.

The shift register 21 and the exclusive-OR circuit 22 have been combined into a "spectral line generator".

The dividing chain 19 has been split up into two parts 19a and 19b. The chain part 19a is formed by a series of flip-flops, the number of which is in keeping with the frequency of sampling of the register 21, so that if the register comprises $m$ flip-flops with $m = 2^a$, the number of flip-flops in the element 19a will be $a + 1$. In particular, if the register 21 comprises 8 flip-flops, the element 19a is constituted by 4 flip-flops effecting a division by 16.

Moreover, the element 19a is arranged in such manner that it permits the restoration, at an output formed to this end, of the clock rate $f$ shifted by $+ \pi/2$ (or $+ 90°$), that is to say in phase with the signal to be demodulated.

The chain part 19b is composed of a series of flip-flops the number of which is in keeping with the frequency of the loop, making it possible to obtain, between the two outputs used, a division ratio of 8, which can be eliminated by the action of the switch 11b, 12a, 12b.

The arrangement of FIG. 6 can be used in the three stages I, II, III, with a suitable adaptation according to circumstances. If the arrangement of FIG. 6 relates to the top loop ($f = 2 f_o$), the action of the switch 11b enables a change to be made from the subcarrier frequency 1024 Hz to 8192 Hz and the divider 5 is connected to the multiplier 6.

If the said arrangement relates to the intermediate stage II (f = 2 F), the action of the switch 12a permits a change to be made from the rhythm of 8 bits/sec. to 64 bits/sec. and the divider 7 is connected to the multiplier 8.

If the said arrangement relates to the third stage III (f = F), the action of the switch 12b, fast with 12a, permits the same change of rhythm. It should be noted that the connections in solid lines extending to the elements 6 or 8 and 5 or 7 are replaced by the connections in dash lines extending to the monostable 13.

With a demodulator carried into practice on this basis, the bandwidth of the loop $4_l$ is not less than 2/1000 of the frequency of this loop and the tracking range is greater than ± 1.3% of the subcarrier frequency, while the acquisition range is greater than ± 7.3/1000 of the subcarrier frequency. The acquisition time is 7 seconds without shift of frequency and at the most 15 seconds for $f_o$ = 8192 Hz and F = 8 bits/sec. and for E/No = 12dB (with E = energy per information bit and No = noise density). The stability of the system is such that after 40 minutes of being under voltage the variation peak to peak of the subcarrier frequency is less than $10^{-3}$ over 11 hours, the input being connected to a wide-band noise source without an information signal.

The practical performances of a synchronizing and demodulating apparatus according to the invention are therefore as follows:

For $f_o$ = 1024 Hz and F = 64 bits/sec. or for $f_o$ = 8192 Hz and F = 64 bits/sec. the acquisition of rhythm is automatic for E/No = + 6 dB, the maintenance of the synchronization is ensured without any bit slip down to E/No = + 3 dB, and the apparatus functions well as far as E/No = 0 dB.

For $f_o$ = 1024 Hz and F= 8 bits/sec, the apparatus works well up to E/No = + 4 dB. The maintenance of the synchronization is ensured without any bit slip up to E/No = + 6 dB.

For $f_o$ = 8192 Hz and F = 8 bits/sec, the apparatus works practically speaking for E/No of the order of + 11 dB and the maintenance of the synchronization is ensured as far as + 13 dB for E/No.

It is found that the practical curves of probability of error for the B φ S code and with a square waveform are situated at less than 2 dB from the theoretical PSK demodulation curve.

It is obvious that the embodiment described is only an example and that it would be possible to modify the same, in particular by substituting technical equivalents, without thereby departing from the scope of the invention.

I claim:

1. A synchronizer-demodulator for demodulating a message coded in biphase S, which is carried, for transmission, by a subcarrier modulated in phase by said message, the composite signal formed by said message-modulated subcarrier having a continuous spectrum, said biphase S code being derived from an NRZ-M code by an inversion in the direction of a transition delayed by a half-period of a bit for manifesting a 1 digit, said NRZ-M code being defined by the appearance of a 1 digit causing a transition in level either positive or negative according to whether the immediately preceding level was respectively low or high, the appearance of 0 digits having no effect on the level, said synchronizer-demodulator comprising: extraction means for extracting said message coded in NRZ-M from said composite signal; a spectral line generator means, which includes means for delaying an input signal applied thereto and multiplication means for multiplying said input signal by said delayed version of said input signal, for regenerating the spectral line at the rhythm F of said message; connection means for connecting as said input signal to said generator said NRZ-M coded message provided by said extraction means; a phase locked loop which includes a voltage controlled oscillator oscillating at said rhythm F; and connecting means for transmitting the signals at said rhythm F supplied by said spectral line generator means to said phase locked loop; means connected to receive the output from said loop for detecting the information of said NRZ-M coded message.

2. The synchronizer-demodulator as set forth in claim 1, in which said extraction means comprises: two connected stages each having substantially identical structure; the first of said stages comprising the serial connection of a spectral line generator producing a frequency of twice the frequency $f_o$ of said subcarrier, a phase locked loop having a voltage-controlled oscillator operating at the frequency $2f_o$, and a scale-of-two frequency divider; the second of said stages comprising the serial connection of a spectral line generator producing a frequency of twice said rhythm F, a phase locked loop having a voltage controlled oscillator operating at the frequency 2F, and a scale-of-two frequency divider, means responsive to said modulated subcarrier and the output from said scale-of-two frequency divider of said first stage for demodulating said message, said demodulated message then being applied as the input to said second stage.

3. The synchronizer-demodulator as set forth in claim 2 wherein the second of said two substantially identical stages further includes a multiplier used as an output means; said synchronizer-demodulator further including means for selectively receiving one of at least two different subcarrier frequencies and for causing said voltage controlled oscillator of said first stage to oscillate at said one of at least two different subcarrier frequencies which comprise at least two band-pass filters each adapted to transmit a distinct respective one of said sub-carrier frequencies, a first switching and connecting element adapted to transmit said message from the output of a respective band-pass filter to the input of said first stage, a second switching element connected to said phase locked loop circuit of said first stage, a third switching element connected to said phase locked loop circuit of said second stage, connection means for connecting said demodulator means of said first stage to said second stage, and means for concomitantly operating said first and second switching elements.

4. The synchronizer-demodulator as set forth in claim 1, in which said delaying means includes shift register means for providing said delayed version of said input signal.

5. A spectral line generator for extracting from an input signal at a given frequency, which input signal carries no energy at said frequency, an output signal with energy at said frequency, which comprises: shift register means which comprises a series of cascade connected flip-flops for delaying said input signal; means for multiplying said input signal with a delayed version thereof as supplied by said shift register means; and means for driving said shift register which comprises a phase locked loop which receives as an input signal the output from said multiplying means, said loop including dividing means an output of which drives said shift register means so as to change the states of said flip-flops and output means for delivering said output signal having energy at said frequency.

6. The line generator as set forth in claim 5, wherein said multiplying means comprises an analog multiplier.

7. The line generator as set forth in claim 5, wherein said multiplication means comprises a binary digital multiplier.

8. The line generator as set forth in claim 5, wherein said multiplication means comprises an exclusive-OR gate.

9. The line generator as set forth in claim 5, wherein said shift register means comprises m flip-flops, wherein $m = 2^a$, and wherein said dividing means comprises at least n flip-flops, wherein $n = a + 1$, and $a$ is an integer.

* * * * *

UNITED STATES PATENT AND TRADEMARK OFFICE
CERTIFICATE OF CORRECTION

PATENT NO. : 3,932,705
DATED : January 13, 1976
INVENTOR(S) : Vianney Jean-Marie Corneille Wulleman It is certified that error appears in the above-identified patent and that said Letters Patent are hereby corrected as shown below:

Column 1, line 52, change "F=O" to --F=---;

Column 3, line 1, change "deffering" to --differing--;

Column 4, line 28, change "O F T,T" to --O    T,T--;

Claim 7, line 2, change "multiplication" to --multiplying--;

Claim 8, line 2, change "multiplication" to --multiplying--.

Signed and Sealed this

Thirteenth Day of July 1976

[SEAL]

Attest:

RUTH C. MASON
*Attesting Officer*

C. MARSHALL DANN
*Commissioner of Patents and Trademarks*